Sept. 12, 1933.  T. KOVACS  1,926,289

ERASER

Filed Dec. 30, 1931

Inventor:
Theodor Kovács
By
Attorney

Patented Sept. 12, 1933

1,926,289

UNITED STATES PATENT OFFICE 1,926,289

ERASER

Theodor Kovacs, Berlin, Germany

Application December 30, 1931, Serial No. 583,956, and in Germany December 31, 1930

9 Claims. (Cl. 120—36)

In typewritten work and in drawing and like pencil or ink productions it is usual to use erasers made of thin slabs of india-rubber or like material in the form of strips or substantially circular discs. They must be held as nearly as possible vertically over the paper in order to touch only the part to be erased. This necessitates holding the hand in an inconvenient position and obstructs a proper view of the point of erasure; moreover even a slight pressure on the eraser easily causes its tip to bend over. This draw-back was not eliminated even when the circular rubber disc was provided with flat metal shields or mountings or when the strip of rubber was enclosed in a straight holder or when the eraser was made in the form of a tube or sleeve enclosing a solid core, as has been previously suggested.

It was also equally ineffective when a short strip of erasing rubber was set in a short straight holder provided with an inclined stock or handle, because even then visibility was obstructed and moreover the short rubber strip was liable to slip back easily in the holder under sufficient pressure.

It is one of the objects of the invention when using a thin erasing slab to provide for holding the hand in a convenient position and ensure complete freedom of view.

It is a further object of the invention to enable very thin erasing slabs to be used, thus economizing in material and ensuring greater accuracy in erasure.

A further object of the invention is to enable the erasing slab to be worn down to a very small piece, thereby reducing waste.

Further objects of the invention will be apparent from the following description.

The invention consists in forming a thin erasing slab with a cup-like curved tip portion at its rubbing edge, the tip portion being either curved in a direction towards the tip or rubbing edge or arched in both directions, that is to say, both in a direction towards the rubbing edge and also transversely. When the eraser is in the form of a thin strip or elongated rectangular piece, it is only necessary that one of the narrow sides, forming the rubbing edges, should be curved or arched, but in the case of an eraser disc, especially a circular one, the marginal portion of the disc is curved towards the edge all the way around the eraser. The curving of the strip or the dishing of the disc may be effected by means of a holder designed to accomplish this object.

The invention also relates to a construction of the holder for maintaining the curvature of the tip portion of the eraser.

The accompanying drawing illustrates examples of the invention.

Figure 1:
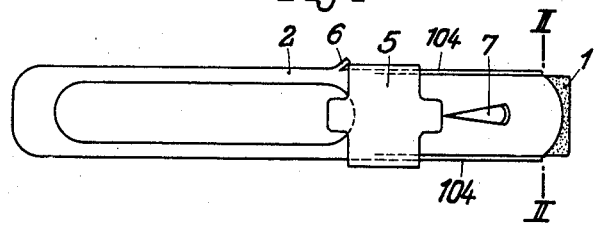
Fig. 1 shows a narrow strip eraser in a clamping holder, the clamping jaw being shown released.
Figure 2:
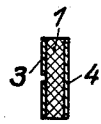
Fig. 2 is a cross-section on the line II—II of Fig. 1.
Figure 3:
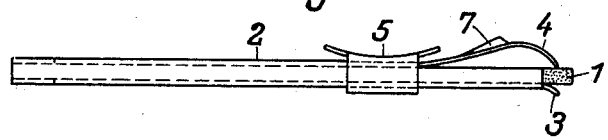
Fig. 3 is a side view corresponding to Fig. 1

In Figs. 1-3, the numeral 1 designates an elongated strip of thin rubber of flat rectangular cross-section and 2 is a sheet metal clamping holder or sleeve. One end 3 of the lower broader side of the holder projects and is bent slightly outwards to form a fixed curved jaw. The corresponding end of the upper broad side of the holder is formed into a spring tongue or jaw 4 by means of slits 104. The tongue 4 projects slightly beyond the jaw 3 and is bent to a curve approximately concentric to the curvature of the jaw 3. On the holder is mounted a slide 5, its end movement, when the holder is opened, being limited by a stop 6. When the slide is moved forwards it presses on a projection 7 formed on the tongue 4 and thus clamps the end of the rubber strip between the jaws 3 and 4 and bends it out of the longitudinal direction, in the example shown through about 30 degrees.

In Figs. 1-3, the jaws 3 and 4 are straight transversely and therefore the rubber strip remains flat transversely as shown in Fig. 3.

Figure 4:
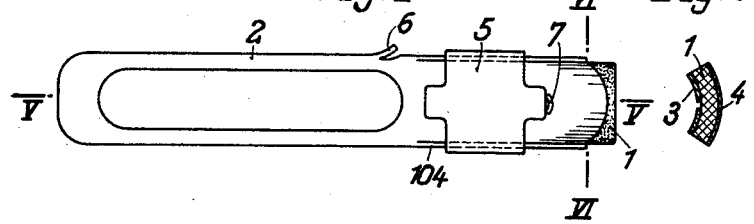
Fig. 4 shows a similar eraser in a slightly different holder and shows the eraser clamped in the holder.
Figure 6:
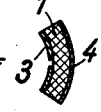
Fig. 6 is a cross-section on the line VI—VI of Fig. 4.
Figure 5:
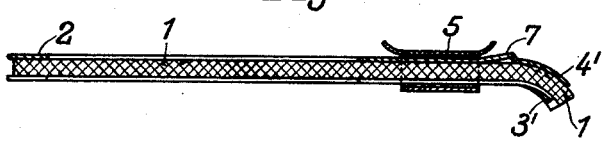
Fig. 5 is a longitudinal sectional view on the line V—V of Fig. 4

The construction shown in Figs. 4 to 6 is similar to that shown in Figs. 1-3 except that the jaws 3' and 4' are bent transversely so that the rubber strip is also bent transversely as shown in Fig. 6.

When the eraser is grasped with the short protruding end resting vertically on the surface of the paper, the hand is inclined. The hand is thus in a convenient position and the view of the part to be erased is not restricted. Moreover if the protruding end of the eraser is arched in both directions as shown in Figs. 4-6, it is stiffened, thus enabling very thin rubber slabs or strips to be used and thereby permitting very accurate erasing work.

Figure 7:
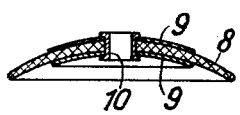
Fig. 7 is a cross-sectional view of a form of circular eraser.

Fig. 7 shows a circular piece of rubber 8 which is mounted between two metal shields 9 secured together and to the rubber disc by a hollow rivet 10 in a similar manner to the common typewriter eraser.

In practice the thickness of the rubber may be less than that shown on the drawing, which is made larger for convenience of illustration.

I claim as my invention:—

1. A holder for a thin slab of erasing material, including means to force and hold the erasing edge in a bent position relative to the slab.

2. A holder for a thin and elongated strip of erasing material, including means to force and hold the erasing edge in a bent and curved position relative to the strip.

3. A holder according to claim 2, in which the means includes a slidable member to bend and hold the erasing edge in bent position.

4. A holder for an elongated strip eraser, comprising a hollow case of flat rectangular cross-section having at the end of one of its broader sides a fixed jaw bent outwards and at one end of its other broader sides a spring jaw bent in the same direction as and adapted to cooperate with the fixed jaw.

5. A holder according to claim 4 in which the jaws are arched transversely.

6. A holder for a circular slab of erasing material, including means to force and hold the slab in the form of a dish-shaped plate.

7. A holder according to claim 6 in which the means includes two dish-shaped plates having a smaller diameter than the diameter of the circular disc of erasing material and between which the circular disc is maintained.

8. A holder for a slab of erasing material, including means to force and hold the erasing edge in a curved position relative to the slab.

9. A holder for a slab of erasing material, including means to force and hold a section of the slab which includes the erasing edge at an angle to the remainder of the slab.

THEODOR KOVACS.